May 29, 1962 J. M. HOVEY ETAL 3,037,126

GATED EXCLUSIVELY-OR CIRCUIT WITH CLOCK PULSE CONTROL

Filed Feb. 1, 1960

INVENTORS
JOHN M. HOVEY
HAROLD H. LEVY

BY Richard C Reed

ATTORNEY

United States Patent Office 3,037,126

Patented May 29, 1962

3,037,126
GATED EXCLUSIVELY-OR CIRCUIT WITH CLOCK PULSE CONTROL

John M. Hovey, 6533 Abington Drive, Oxon Hill, Md., and Harold H. Levy, 7501 Chesapeake St., Landover, Md.

Filed Feb. 1, 1960, Ser. No. 6,073
3 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to GATED EXCLUSIVELY OR logical circuits and, more particularly, to GATED EXCLUSIVELY OR circuits in which dependable operation over a very wide temperature range is provided.

In computer applications, often some pulse paths in sequential logic circuits inadvertently produce more delay than do others. For this reason, it is sometimes difficult to build circuits to perform sequential functions that depend on precise coincidence. Also, when the circuitry is subjected to temperature changes, instability is increased to a marked degree and circuit reliability is reduced. The present invention overcomes these difficulties encountered in the prior art.

The general purpose of this invention is to provide an EXCLUSIVELY OR circuit which embraces all the advantages of similarly employed prior art devices and possesses none of the aforedescribed disadvantages. To attain this, the present invention contemplates a unique combination of logical circuits, an enabling gate which permits operation with input pulses which are not in coincidence over their entire length, and a temperature compensating means whereby instability and undue delay are avoided.

An object of this invention is the provision of an EXCLUSIVELY OR logical circuit in which coincidence of simultaneous inputs is assured.

Another object is to provide an EXCLUSIVELY OR logical circuit which reliably operates over a very large temperature range.

A further object of this invention is the provision of an EXCLUSIVELY OR logical circuit which operates with inputs which are not in coincidence throughout their entire lengths.

With these and other objects in view, as will hereinafter more fully appear and which will be more particularly pointed out in the appended claims, reference is now made to the following description taken in connection with the accompanying drawings in which:

Briefly, the circuit of this invention is a GATED EXCLUSIVELY OR logical circuit. Two input terminals are connected to an OR logical circuit. In order that the final output of the circuit of this invention occur only as the result of the application of an input signal to one of the two input terminals, also connected to the two input terminals is a first AND logical circuit, the output of which is connected to an INHIBITOR logical circuit made up of a NOT logical circuit connected to a first input of a second AND logical circuit. A clock pulse source is connected as the second input to the second AND circuit. The output of the first AND circuit is the inhibiting signal for the INHIBITOR circuit and the clock pulse is the inhibited signal. The output of the INHIBITOR circuit occurs when there is only one input signal present at the two input terminals and when the clock pulse is applied to the second AND circuit. The outputs of the INHIBITOR and the OR circuits are the inputs for a third AND circuit, the output of which is the GATED EXCLUSIVELY OR presentation of the input signals at the two input terminals. The enabling gate action of the clock leads to the terminology GATED EXCLUSIVELY OR.

Figure 1:
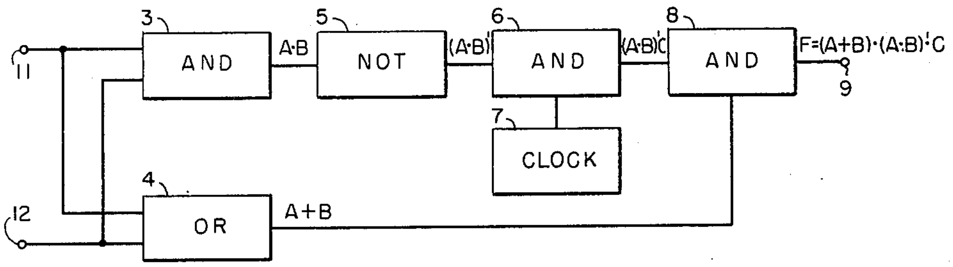
FIG. 1 shows, in block diagram, the logical circuits that make up the GATED EXCLUSIVELY OR circuit of this invention.

Referring now to the drawings, there are shown in FIG. 1, two input terminals 11 and 12. Connected to terminals 11 and 12 are the AND circuit 3 and an OR circuit 4. The input signals applied to terminals 11 and 12 are symbolized as A and B, respectively. The output of the AND circuit 3 is expressed as A.B which shows that no output occurs if either of the inputs A or B is zero. The output of the OR circuit 4 is expressed as A plus B which shows that an output occurs if either or both inputs A and B have signals applied thereto. The NOT circuit 5 and the AND circuit 6 are units in an INHIBITOR logical circuit. The output of the NOT circuit 5 is expressed as (A.B)′ which is read to be: the output of the AND circuit 3 has been inverted to oppose in polarity and has been amplified to exceed the absolute value of a clock pulse. This clock pulse, from clock 7, along with the output of the NOT circuit 5, make up the inputs for the AND circuit 6. The output of AND circuit 6 is expressed as (A.B)′C which is read as: the presence of both input signals A and B will inhibit the clock pulse C and, the absence of an input pulse at either A or B would eliminate an inhibiting pulse to inhibit the clock pulse C. The absence of an inhibiting pulse allows clock pulse C to be the output of the INHIBITOR circuit. The outputs of the INHIBITOR and the OR circuits form the inputs of a third AND circuit 8. The output of the AND circuit 8, which appears at output terminal 9, is the desired GATED EXCLUSIVELY OR signal. This output signal, F, is represented as being (A plus B)·(A·B)′·C which is read to be: an output signal will appear at output 9 if, and only if, only one input A or B is applied to input terminals 11 and 12 at any single instance; a signal which is the output of the OR circuit 4 is combined with the clock pulse C, in the absence of an inhibiting pulse, to produce an output F; and that the inhibiting pulse is present only when input signals A and B are simultaneously applied.

Figure 2:
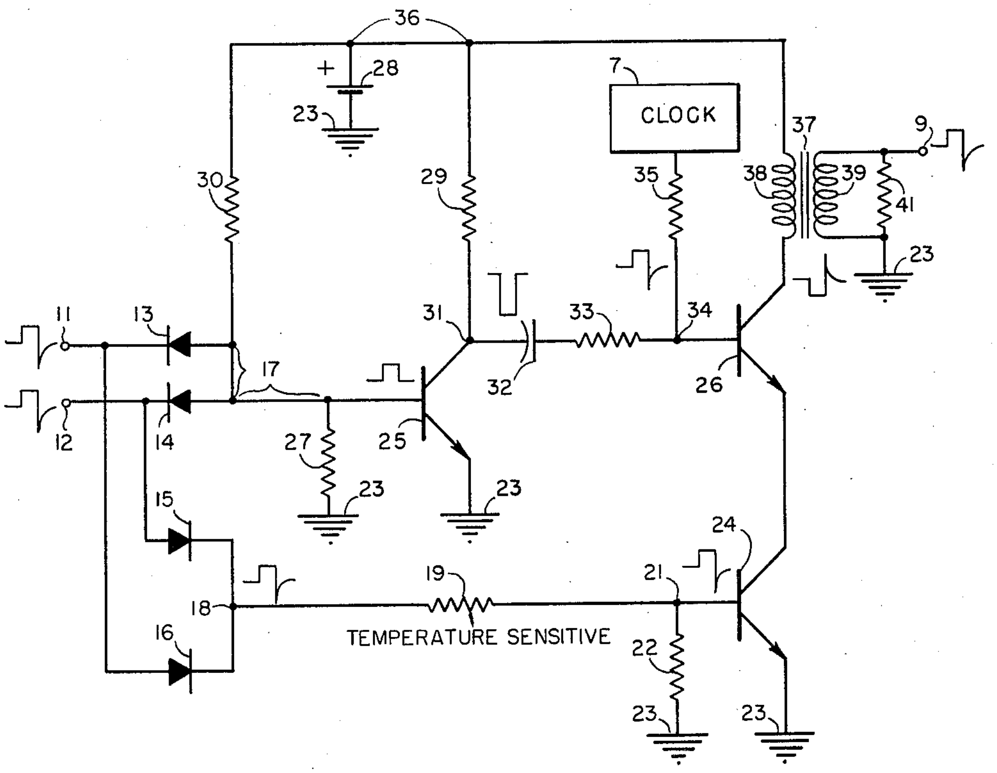
FIG. 2 shows a schematic diagram of an embodiment of the circuit of this invention.

The structure shown in FIG. 2 shows the input terminals 11 and 12 with the waveforms of the input signals applied thereto. Connected to terminal 11 is the cathode of a unidirectional element 13 and the anode of a unidirectional element 16. Connected to input terminal 12 is the cathode of unidirectional element 14 and the anode of a unidirectional element 15.

The anodes of unidirectional elements 13 and 14 are joined at a junction 17. A power source 28 is connected at its positive side to junction 17 through a current limiting resistor 30 and a junction 36. Also connected to junction 17 are the base of an NPN transistor 25 and one end of a resistor 27, the other end of resistor 27 being connected to a common return 23. The negative side of the power source 28 is connected to the common return 23.

Also connected to junction 36 is one side of a current limiting resistor 29, the other side of which is connected to a junction 31. Also connected to junction 31 are the collector of NPN transistor 25 and one side of a capacitor 32. The emitter of transistor 25 is connected to the common return 23. The other side of capacitor 32 is connected to one side of a resistor 33, the other side of which is connected to a junction 34. A clock 7 is connected through current limiting resistor 35 to junction 34. Also connected to junction 34 is the base of NPN transistor 26, the collector of which is connected to one end of winding 38 on a transformer 37. The other end of winding 38 is connected to junction 36. An output winding 39 on transformer 37 has one end connected to the common return 23, the other end is connected to output terminal 9, and a shunting resistor 41 is connected across the ends of the output winding.

The cathodes of unidirectional elements 15 and 16 are joined at a junction 18 to comprise the OR circuit. Also connected to junction 18 is one side of a resistor 19 with a positive temperature coefficient which is resistance responsive to temperature changes to allow operation over a very large temperature range. The other side of the resistor 19 is connected to a junction 21. Junction 21 is connected to the common return 23 through current limiting resistor 22. Also connected to junction 21 is the base of NPN transistor 24, the emitter of which is connected to the common return 23 and the collector of which is connected to the emitter of transistor 26, to complete the circuitry.

The operation of the circuit as shown in FIG. 1 is actuated by an input signal applied to the OR gate 4 whose output will allow the AND gate 8 to conduct. When the AND gate 6 conducts, an output is provided at terminal 9 i.e., only if AND gate 8 is conducting, if a clock pulse C is present, and if no negative pulse output is produced by the NOT gate 5. NOT gate 5 will have a negative output pulse if input signals are applied to both input terminals 11 and 12, respectively. The AND gate 3 senses the presence or absence of input signals at both of the input terminals 11 and 12.

In FIG. 2, this operation is traced as, for example, an input pulse is applied to terminal 11 and passes through diode 16, junction 18, resistor 19, junction 21 to the base of the NPN transistor 24 to render it conductive. In order that an output appear at output terminal 9, it is also necessary that transistor 26 be conducting. The input pulse applied at terminal 11 provides a bias which renders diode 13 nonconductive from the power source 28 through resistor 30. However, diode 14 provides an alternate low impedance path for the flow of current from the power source 28 and, as a result, the potential on the base of transistor 25 is not sufficient to render transistor 25 conductive. Since the positive potential on the base of NPN transistor 25 is insufficient to render the transistor conductive, no inhibiting pulse is formed across capacitor 32 to prevent the clock pulse from clock 7 from rendering the NPN transistor 26 conductive. When this clock pulse is coincidental with the input pulse at terminal 11, the EXCLUSIVELY OR circuit will provide an output at terminal 9.

Should there be an input signal applied at terminal 11 and another input signal at terminal 12, then the potential at junction 17 would rise to a level which is sufficient to render transistor 25 conductive, the output of which is an amplification and an inversion so as to be an inhibiting pulse to render the clock pulse ineffective and polarized such that transistor 26 will not be rendered conductive.

Thus, it is seen that an output is provided at output terminal 9 only when one input signal is applied at input terminal 11 or 12 in coincidence with the clock pulse. Exact coincidence of inputs on both of the input terminals is not necessary for proper operation of the circuit since the enabling clock pulse is of shorter duration than either of the input pulses. It is only necessary that the input signals occur during the clock pulse to preclude an erroneous output caused by the early application of an input to the circuit.

Resistor 27 is included to shorten recovery time at high temperatures. The transistor 25 conducts at 1 volt, but .7 volt would turn on the transistor. As a result, resistor 27 is added to divide and provide potential of approximately .35 volt at junction 17. Resistor 27 further provides a discharge path to bleed down the potential across diodes 13 and 14 resulting from the application of the potential from the power source thereacross thereby keeping the voltage at junction 17 at less than the possible turn on voltage for transistor 25.

The circuit can be constructed of the following elements. Diodes 13 through 16 can be typed 1N118 or 1N251. The resistor 19 is a 1K Sensistor which is temperature sensitive to afford stable operation of the circuit over a range of −65 to plus 85 degrees centigrade. Resistor 22 has the value of 1.3K. The transistors 24, 25 and 26 are NPN type 2N337. Resistor 27 is 6.2K. Capacitor 32 is 1$\mu f$, resistor 33 is 2.2K, resistor 35 is 1.5K, resistor 30 is 7.5K and resistor 29 is 1K. The ratio of windings 38 to 39 is 3 to 1. The shunting resistor 41 is .75K. The power source has a potential of 7.5 volts.

The circuit of this invention can be modified in the following manner. To two input terminals can be connected four diodes in the same manner as 13, 14, 15 and 16 are connected with the cathodes of the last numbered diodes connected to the emitter of an NPN transistor, the anodes of the first two diodes connected to the anode of a fifth diode and to a 5.1K resistor which is connected at its other side to the positive side of a power source of 7.5 volts. The negative side of the power source is connected to one end of a transformer winding, the other end of which is connected to the collector of the transistor. The base of the transistor is connected to the cathode of the fifth diode and is grounded across a 6.2K resistor. An output winding on the transformer has a 14 ohm resistor connected thereacross and grounded at one end, with the other end being connected to the output terminal. The diodes are type 1N116 and the transistor is PNP type 337. In this circuit, the feedback being applied to the emitter of the transistor allows control of the circuit by the base of the transistor and provides the desired advantage of leaving the base free of external low impedance circuitry.

Obviously many modifications and variations of the present invention are possible in the light of the above teachings. It is therefore to be understood that within the scope of the appended claims the invention may be practical otherwise than as specifically described.

What is claimed is:

1. In an EXCLUSIVELY OR logical circuit, a pair of input terminals, a first AND gate having two first input means and a first output means, one of said terminals connected to one of said first input means and the other of said input terminals connected to the other of said first input means, a NOT gate having a second input means and a second output means, said first output means connected to said second input means, a second AND gate having two third input means and a third output means, a clock pulse source, one of said third input means connected to said second output means and the other of said third input means connected to said clock pulse source, a third AND gate having two fourth input means and a fourth output means, an OR gate having two fifth input means and a fifth output means, one of said fifth input means connected to one of said input terminals and the other of said fifth input means connected to the other of said input terminals, said fifth output means connected to one of said fourth input means, said third output means connected to the other of said fourth input means, and an output terminal connected to said fourth output means.

2. In a GATED EXCLUSIVE OR logical circuit comprising terminal means for providing a pair of input signals, means for providing a first coincidence gate connected to the said input terminals, an inhibiting logical circuit composed of inverting circuit means and a second coincidence gating means, said inverting circuit means being connected to said first coincidence gate, means for providing a clock pulse connected to said second coincidence gate and a third coincidence gating means connected to the output of said inhibiting circuit, the output signal being developed across the output of said third coincidence circuit, means for providing OR gating logic, said OR gate connected between said pair of input terminal means and the said third coincidence gating means.

3. In the GATED EXCLUSIVE OR logical circuit as set forth in claim 2 wherein there is also provided a resistor having a high temperature coefficient connected between said OR gating means and said third coincidence gating means to allow operation over a very large temperature range.

References Cited in the file of this patent

UNITED STATES PATENTS

| | | |
|---|---|---|
| 2,748,269 | Slutz | May 29, 1956 |
| 2,850,647 | Fleisher | Sept. 2, 1958 |